US012774882B2

(12) United States Patent
Weiß et al.

(10) Patent No.: US 12,774,882 B2
(45) Date of Patent: Oct. 27, 2026

(54) METHOD AND DEVICE FOR MEASURING OPTICAL THICKNESS

(71) Applicant: PRECITEC OPTRONIK GMBH, Neu-Isenburg (DE)

(72) Inventors: Stephan Weiß, Rodgau (DE); Philipp Nimtsch, Gießen (DE); Tobias Beck, Heusenstamm (DE); Christoph Dietz, Obertshausen (DE)

(73) Assignee: PRECITEC OPTRONIK GMBH, Neu-Isenburg (DE)

( * ) Notice: Subject to any disclaimer, the term of this patent is extended or adjusted under 35 U.S.C. 154(b) by 178 days.

(21) Appl. No.: 18/692,736

(22) PCT Filed: Sep. 16, 2022

(86) PCT No.: PCT/EP2022/075768
§ 371 (c)(1),
(2) Date: Mar. 15, 2024

(87) PCT Pub. No.: WO2023/041707
PCT Pub. Date: Mar. 23, 2023

(65) Prior Publication Data

US 2024/0377186 A1 Nov. 14, 2024

(30) Foreign Application Priority Data

Sep. 16, 2021 (DE) ..................... 10 2021 124 048.4

(51) Int. Cl.
*G01B 11/06* (2006.01)

(52) U.S. Cl.
CPC ...... *G01B 11/0625* (2013.01); *G01B 11/0675* (2013.01); *G01B 2210/56* (2013.01)

(58) Field of Classification Search
CPC ............ G01B 11/0625; G01B 11/0675; G01B 2210/56; G01B 11/0683; H01L 21/67253; H01L 22/12
See application file for complete search history.

(56) References Cited

U.S. PATENT DOCUMENTS 10,168,142 B2 1/2019 Okamoto
10,890,433 B2 1/2021 Kimura
(Continued)

FOREIGN PATENT DOCUMENTS

DE 102016005021 A1 9/2016
DE 102017122689 A1 4/2019
(Continued)

OTHER PUBLICATIONS

International Search Report and Written Opinion cited in corresponding international patent application No. PCT/EP2022/075768; Jan. 20, 2023; 14 pp.
(Continued)

*Primary Examiner* — Kara E. Geisel
*Assistant Examiner* — Christina I Xing
(74) *Attorney, Agent, or Firm* — Lempia Summerfield Katz LLC

(57) ABSTRACT

An optical thickness measuring device includes a light source, a measuring head, an optical spectrometer with an optical component for spectrally splitting an input light, a detector, and an evaluation device. The light source is optically connected to the measuring head and is configured to generate an at least low-coherence measuring light and to direct it to the measuring head. The measuring head is optically connected to the spectrometer and is configured to direct the measuring light onto a measuring object and to direct light reflected therefrom, which originates from two different surfaces, onto a measuring object, which originates
(Continued)

from two different surfaces, and to direct the reflected light to the spectrometer as input light. The spectrometer is electrically connected to the evaluation device and is configured to generate a spectrum of the reflected light, which originates from the two different surfaces of the measurement object and interferes with one another, and to send the spectrum to the evaluation device as an electrical signal. The evaluation device is configured to determine a distance between the two surfaces—i.e. the thickness of the measurement object.

18 Claims, 8 Drawing Sheets

(56) References Cited

U.S. PATENT DOCUMENTS

| | | | | |
|---|---|---|---|---|
| 11,027,364 | B2 | 6/2021 | Schönleber | |
| 11,168,977 | B2 | 11/2021 | Kimura | |
| 2017/0131081 | A1* | 5/2017 | Lau | G01B 11/14 |
| 2018/0172431 | A1* | 6/2018 | Okamoto | G01J 3/2803 |
| 2019/0091798 | A1 | 3/2019 | Schönleber | |
| 2020/0103220 | A1* | 4/2020 | Kimura | B24B 49/12 |
| 2020/0340801 | A1 | 10/2020 | Kimura | |

FOREIGN PATENT DOCUMENTS

| | | | |
|---|---|---|---|
| JP | H08254464 | A | * 10/1996 |
| JP | H11142240 | A | 5/1999 |
| JP | 2020056579 | A | 4/2020 |

OTHER PUBLICATIONS

Office Action cited in Japanese patent application No. 2024-516753; Apr. 8, 2025; 15 pp.

* cited by examiner

METHOD AND DEVICE FOR MEASURING OPTICAL THICKNESS

RELATED APPLICATION DATA

This application is a national stage application based on International Application No. PCT/EP2022/075768 filed Sep. 16, 2022, which claims the benefit of and priority to German Application No. DE 10 2021 124 048.4 filed Sep. 16, 2021. The entire contents of these prior filed applications are incorporated herein by this reference.

BACKGROUND

Technical Field

The present disclosure relates to an optical thickness measuring device with a light source, a measuring head, an optical spectrometer with an optical component for the spectral splitting of an input light and a detector as well as an evaluation device.

Description of the State of the Art

In the manufacture of wafers for semiconductor production, the wafer must be brought to the correct absolute total thickness and a required minimum thickness distribution within the wafer by means of a grinding process after cutting. To check the grinding process, the thickness of the wafer is measured during grinding. Since the thickness can decrease significantly during grinding, the measuring range to be covered by the measuring process is considerable.

Systems for measuring the thickness of a wafer are known which measure the thickness of the wafer spectral-interferometrically during the grinding process. Such systems generally comprise a light source, a measuring head and an optical spectrometer. The measuring head directs the light from the light source onto the wafer to be measured and receives the light reflected from it. The reflected light is fed to the spectrometer where it is split according to its wavelength components. This makes it possible to measure the optical spectrum of the reflected light. The measurement result is analyzed in an evaluation unit to determine the thickness of the wafer.

With existing systems, it is usually only possible to measure either the initially thick wafer or the thin wafer created after the grinding process. This is primarily due to the fact that for the wafer in its initial thickness, the light from the light source must have a wavelength in the infrared range. The wafer (e.g. silicon) is largely opaque in the visible spectrum or the visible spectrum has only a low penetration depth. At the same time, light sources that emit light in this spectrum are not broadband enough to enable sufficiently good precision for thinner layers, for which measuring light in the visible range offers significantly higher accuracy.

This usually requires the use of two separate interferometry systems with the associated higher costs and greater effort in terms of calibration and synchronization of the devices.

Even partial integration of, for example, the evaluation units or the measuring heads only partially solves the problems mentioned above, as most components are still required in duplicate.

SUMMARY

It is an object of the present disclosure to provide an optical thickness measuring device for measuring a large coating thickness range, which at least alleviates the above-mentioned disadvantages and in particular covers a large measuring range and at the same time is compact and inexpensive in design.

The object is solved by an optical thickness measuring device according to independent claim 1. Further embodiments of the present disclosure are given in the dependent claims.

The optical thickness measuring device according to the present disclosure has a light source, a measuring head and an optical spectrometer. The optical spectrometer has an optical component for spectrally splitting an input light and a detector. Furthermore, the optical thickness measuring device has an evaluation unit.

The light source is optically connected to the measuring head, for example by an optical waveguide, and is configured to generate at least low-coherence measuring light and to transmit this to the measuring head, for example via the aforementioned optical waveguide. The term "optically connected" is intended here and in the following to include both an optical waveguide-based transmission of the light—for example via a fiber—and a free-beam-based transmission.

The measuring head is configured to guide the measuring light onto a measurement object, for example a wafer. This can be done, for example, in a free beam through air or a corresponding medium such as water, oil, acids or other liquids used in wafer processing. Furthermore, the measuring head is configured to collect light reflected from the object to be measured, which originates from at least two different surfaces of the object to be measured, and to transmit it to the spectrometer as input light, for example via an optical waveguide. The different surfaces can be, for example, the front and the back of the wafer or generally different optical interfaces.

The spectrometer is electrically connected to the evaluation device and is configured to generate an optical spectrum of the interference of the reflected light originating from the at least two different optical interfaces by means of the optical component, to convert it into electrical signals by means of the detector and to send the electrical signals to the evaluation device.

The evaluation device is configured to determine a distance between at least two interfaces—for example, the thickness of the measurement object or a layer of the measurement object. The thickness is determined by evaluating the modulations of the interference caused by the difference in run length between the interfaces, for example using a Fourier transformation. The optical thickness determined in this way is calculated back to the geometric thickness using the known refractive indices of the material.

According to the present disclosure, it is provided that the measuring light has a first and a second wavelength range and the spectrometer has two light inputs for the reflected light, with reflected light of the first wavelength range passing through the first light input and reflected light of the second wavelength range passing through the second light input. The light inputs are spatially spaced in such a way that both wavelength ranges are spectrally split by a common component and the imaging ranges on the detector overlap in the direction of the spectral splitting.

The wavelength ranges in one example are low-coherent, i.e. they are polychromatic light.

In addition to a first and a second wavelength range, a third or more wavelength ranges can also be used. Accordingly, the most suitable wavelength range for determining the interfacial distance can be used in each case.

In an embodiment of the present disclosure, it is provided to switch between the wavelength ranges, in particular to switch back and forth in a fixed cycle.

Switching between the individual wavelength ranges can, for example, be carried out at a switching rate in the kHz range, for example between 0.5 kHz and 100 kHz. Such a fast switching rate enables quasi-simultaneous measurement with several wavelength ranges; in particular, a change in the distance between the layers, such as a wafer thickness, between the two measurement times is small relative to the measurement accuracy.

The common optical component that splits the light spectrally can be a dispersive optical element, for example. A dispersive optical element is an optical element in which an optical property that is important for the function, e.g. the refractive index or a diffraction angle, shows a pronounced dispersion and the dispersion is desired for the function. A normal glass lens is therefore not a dispersive optical element, even though the refractive power depends on the wavelength to a small extent. This is not the case with dispersion prisms or diffraction gratings, which exhibit strong dispersion and are designed to refract or diffract light of different wavelengths to a different extent.

During spectral splitting by the optical component, diffraction, reflection or refraction takes place depending on the wavelength in such a way that the point of incidence after focusing the diffracted/reflected/refracted light depends on the wavelength. Conversely, by selecting a suitable point of incidence, the spatial shift caused by the two different wavelength ranges can be at least partially compensated for and a single optical component and a single detector can be used for two different wavelength ranges.

In one example, one wavelength range is assigned to each of the light inputs. As already mentioned, this makes it possible to at least partially compensate for the different diffraction/reflection/refraction angles caused by the different wavelength ranges and thus generate at least a partial overlap of the spectrally split beam path.

This enables a particularly compact design of the spectrometer, which on the one hand saves costs and makes it possible to meet particularly strict installation space requirements. On the other hand, such a compact design is also beneficial to the accuracy of the spectrometer: the smaller the dimensions of the optical elements of the spectrometer (e.g. the diameter of the lenses), the easier it is to achieve virtually error-free imaging over the entire spectral range of both wavelengths. The better the imaging quality, the higher the modulation contrast and thus also the quality of the measurement result. In this way, the required field of the coupling and decoupling optics is as similar as possible and therefore minimal. In addition, the overlapping spectra also minimize the required detector length, or the splitting can take place over more detector pixels, which improves the resolution.

The term light input should not necessarily be understood here as an input attached to an external housing, but rather the point of entry of the respective light into the beam path of the spectrometer.

In an embodiment, the light source comprises at least a first light source unit and a second light source unit.

In one example, the measuring light generated by the two light source units is coupled into the measuring head via optical connections, for example optical fibers. It may be particularly advantageous that the measuring light of each light source unit is coupled in via its own optical fiber. It may be particularly advantageous to use fibers of different types for the two wavelength ranges. The fiber type can be matched to the wavelength range in terms of its transmission properties, for example single-mode or multimode fibers. The two optical fibers can be enclosed in a common cladding. Alternatively, the measuring light from both light source units is coupled in via a common optical fiber.

Alternatively, a separate measuring head can also be provided for each wavelength range, with each measuring head being connected separately to one light source unit, for example via one optical waveguide each.

Irrespective of the design as separate light source units, the wavelength ranges can be in the visible and near-infrared range (VIS and NIR), in particular between 400 nm and 1600 nm. For example, the first wavelength range can be between 430 nm and 700 nm. The second wavelength range can, for example, be a sub-range in the 700 nm to 1600 nm range, in particular approx. 830 nm to approx. 930 nm, approx. 870 nm to approx. 970 nm or approx. 950 nm to approx. 1100 nm.

The distance to be determined with the wavelength ranges can be between 0.5 μm and 10 μm in the VIS range (visible range), for example, and in the NIR range it can be up to a thickness of 150 μm silicon, for example.

In one example, the bandwidth of the first light source unit differs from the bandwidth of the second light source unit. In particular, the first wavelength range is broadband and the second wavelength range is comparatively narrower. The narrower wavelength range enables measurement of thicker wafers, while the broadband wavelength range provides better accuracy for thin wafers.

In an embodiment, the first light source unit is a light emitting diode (LED) and the second light source unit is a superluminescent diode (SLD).

The narrowband wavelength range may be particularly advantageous for the long-wave wavelength range and the broadband wavelength range for the short-wave wavelength range.

As an alternative to using two separate light sources as light source units, it is also possible to use a single light source whose spectral range covers both wavelength ranges and to separate the wavelength ranges by means of filters or dichroic beam splitters.

In one embodiment, it may be provided that the light source is configured in such a way that the measuring light in the first wavelength range can be generated alternately with the measuring light in the second wavelength range. In this way, it is possible to switch quickly between the two measuring ranges. Accordingly, the readout of the spectrometer or the evaluation of the electrical signal by the evaluation device can take place synchronously, for example in a fixed cycle.

In an advantageous embodiment, it is provided that the first light source unit can be switched independently of the second light source unit.

It is also conceivable to use the first wavelength range in a first period, the first and second wavelength ranges alternately in a second period and the second wavelength range in a third period. This offers the possibility that when measuring a thickness that is already optimally covered by one wavelength range, only the corresponding wavelength range is emitted.

In a measuring range that is similarly covered by both wavelength ranges, the emission of the two wavelength ranges and the associated evaluation can be alternately clocked. This offers the possibility of calculating the resulting thickness values with each other, for example weighted, to form a value and thus possibly achieve a higher measurement accuracy than with just a single wavelength range.

If two spectra are generated for one thickness value during a measurement, the thickness value can be calculated from the two partial spectra. If two measurement spectra with different bandwidths are used, the narrower-band spectrum for thicker wafers provides a higher accuracy and the wider-band spectrum for thin wafers.

The calculation of the thickness value can, for example, provide for a statistical weighting of the two partial spectra. The narrowband spectrum provides a higher accuracy for thick wafers, the broadband spectrum for thin wafers. The thickness value that can be calculated is always based on the partial spectrum that is best suited for the current thickness.

In one example, this calculation is not based on a fixed threshold value, but on a weighted average value, for example. A transition range can be defined, within which the weighting depends on the approximate position of the transition range at which the current thickness to be measured is located or/and the weighting can be dependent on the last calculated value or/and on the two measured values.

Alternatively, or additionally, the weighting of the two measured values for the same thickness can also be carried out on the basis of the quality of the individual measured values determined. A measurement peak height (corresponding to the amplitude of the interference modulation) or any measure of the statistical noise of the value (e.g. variation over a period of time) can be used as a measure of quality.

The object is also solved by a method according to the independent method claim.

The method according to the present disclosure is used to determine the distance between two boundary surfaces of a measurement object and has the following steps:

Generating a measurement light with a first wavelength range; guiding the measurement light onto the measurement object; collecting the light reflected by the measurement object and generating a spectrum of the reflected light with interference modulations; repeating the aforementioned steps with measurement light of a second wavelength range, wherein the first and second wavelength ranges are at least partially different; determining a first interfacial distance value using the spectrum of the first wavelength range of the measurement light; determining a second interfacial distance value using the spectrum of the second wavelength range of the measurement light; calculating an interfacial distance using the first and/or the second interfacial distance value. The interface distance values are measured values for the distance between two optical interfaces, in particular for the thickness of the layer between two optical interfaces. The first and second wavelength ranges can be evaluated one after the other, alternately or simultaneously.

In this way, the distance between two interfaces of a measurement object can be measured continuously over a wide range with high accuracy. High accuracy can also be achieved in distance ranges in which the intensity or quality of one or both emitting light sources is lower, but the measurement result of both measuring light ranges can be used.

In an embodiment of the method, the interference of the reflected light occurs either between a reflected light of a boundary surface of the measurement object and a reference light and/or between a reflected light of a first boundary surface of the measurement object and the reflected light of a second boundary surface of the measurement object. An absolute distance value can be calculated in the event of interference between the reflected light of an interface and the reference light, which has traveled a known or at least temporally constant path length. In the case of interference between the reflected light of two boundary surfaces, a distance value between the two boundary surfaces can be calculated.

It is advantageous if an averaging of the first and second interface distance, such as a weighted averaging, is carried out when calculating the interface distance.

BRIEF DESCRIPTION OF THE DRAWINGS

In the following, embodiments of the present disclosure are explained in more detail with reference to the drawings. These show.

DETAILED DESCRIPTION OF EMBODIMENTS

Measuring Principle and Problem Definition

Figure 1:
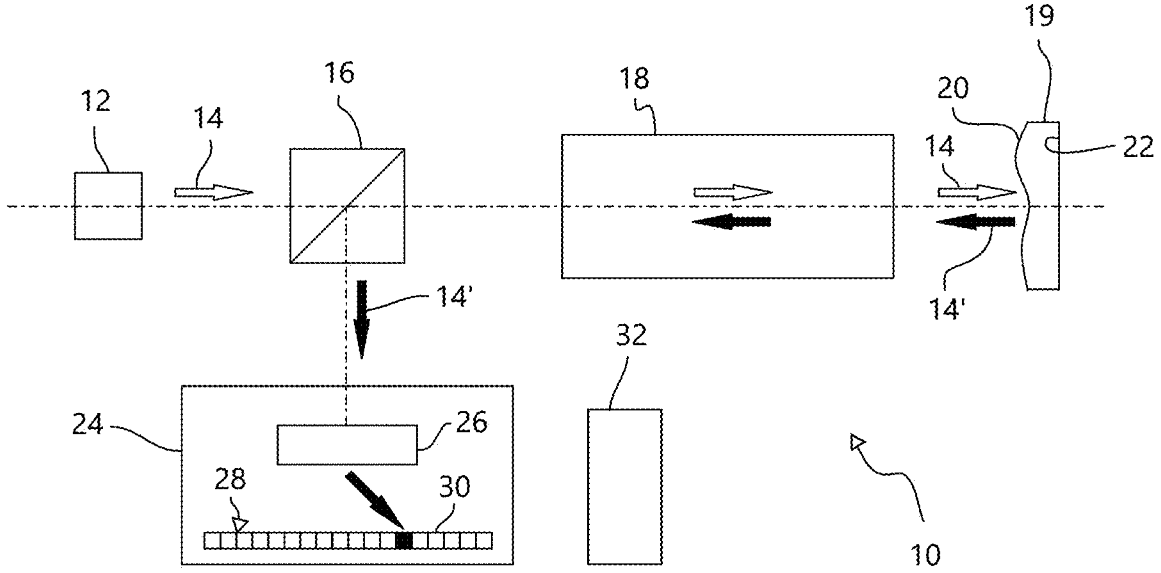
FIG. 1 a schematic representation of a device for measuring thicknesses according to the prior art.

FIG. 1 illustrates in a schematic representation a measuring device 10 according to the prior art. A measuring light source 12 generates measuring light 14, which is directed via a light splitting device 16—for example a beam splitter cube or a fiber coupler—and via a measuring head 18 onto a measurement object 19. In FIG. 1, the part of the measuring light 14 that is reflected by a first boundary surface 20 or a second boundary surface 22 of the measurement object 19 is indicated by black arrows and provided with the reference number 14'. The reflected measuring light 14' is picked up by the measuring head 18 and directed by the light dividing device 16 onto a spectrometer 24. The spectrometer 24 contains a dispersive optical element 26, which may, for example, be a diffraction grating or a dispersion prism.

Further, the spectrometer 24 includes a detector 28 comprising a plurality of photosensitive cells 30. The photosensitive cells 30 are arranged along a straight or curved line and are hereinafter referred to as pixels. The signals generated by the pixels are evaluated by an evaluation device 32 in order to calculate a distance value between the two surfaces 20, 22.

During a measurement, the reflected measuring light 14' is deflected by the dispersive optical element 26, the deflection angle depending on the wavelength of the reflected measuring light 14'. In measuring devices in which the reflected measuring light 14' from one interface 20 interferes with measuring light reflected from another interface 22, a broad spectrum is obtained on the detector 28, which is spectrally modulated. The detector 28 then records a large number of intensity maxima, with a modulation frequency being assigned to each distance between the first and second interfaces 20, 22. The desired distance value can be calculated from the signal generated by the detector 28 by means of a Fourier transformation, as is known per se in the prior art.

First Embodiment

Figure 2:
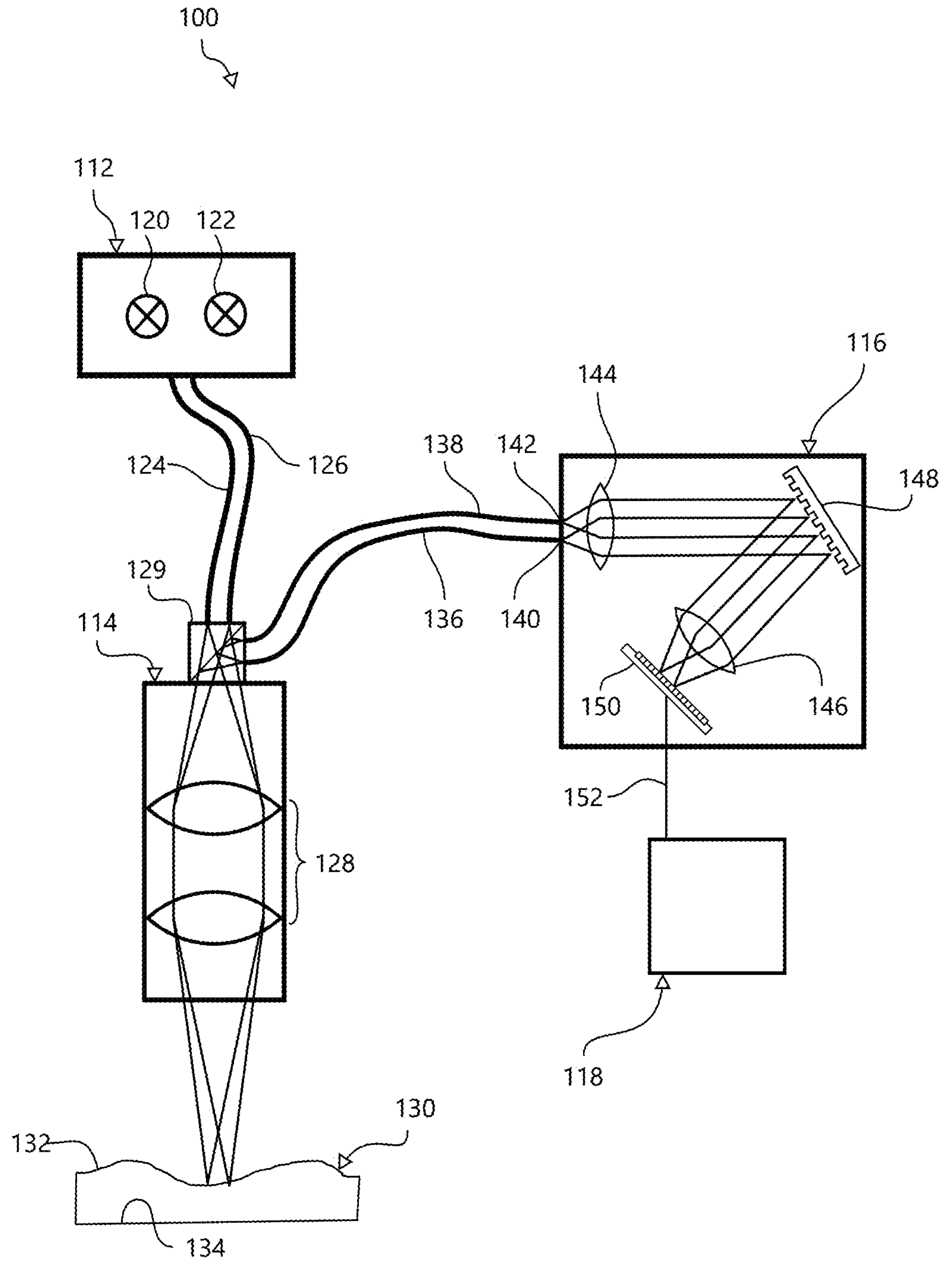
FIG. 2 a first embodiment of an optical thickness measuring device.

FIG. 2 illustrates a schematic representation of a first embodiment of an optical thickness measuring device 100. The thickness measuring device 100 has a light source 112, a measuring head 114, an optical spectrometer 116 and an evaluation device 118.

The light source 112 is configured to generate low-coherence light in at least two different wavelength ranges or frequency bands. At least one of the two wavelength ranges is advantageously broadband, i.e. the emitted light comprises an entire continuous range of wavelengths, for example a range of 100 nm or more. In order to generate this light, the light source 112 in the embodiment shown in FIG. 2 comprises two light source units 120, 122. In the embodiment shown, one light source unit 120 is equipped with a light emitting diode as the radiation source, while the other light source unit 122 is equipped with a superluminescent (SLD) diode as the radiation source. Example wavelength ranges are 430 nm-700 nm, 830 nm-930 nm, 870 nm-970 nm or 950 nm-1100 nm.

The light emitted by the light source units 120, 122 is guided to the measuring head 114 via two separate waveguides—in FIG. 2 the first optical fiber 124 and the second optical fiber 126. The measuring light coupled into the measuring head 114 is directed onto the surface of a measuring object 130 via suitable optics 128. Light of one wavelength range or one light source unit is guided in each of the fibers. The wavelength ranges are therefore guided through separate fibers.

One part of the measurement light is reflected at a first surface 132 and a second part is reflected at a second surface 134 of the measurement object 130. In FIG. 2, the reflection process is only shown as an example on the first surface 132 in order to keep the illustration clear. A separate measurement spot is created on the surface of the measurement object 130 for each wavelength range that is guided in a separate fiber.

Some of the light reflected from the two surfaces 132, 134 is in turn coupled into the measuring head 114, where it is coupled into one of the fibers 136, 138 and thus reaches the spectrometer 116.

Measurement light which originates from the first fiber 124 and was reflected by one of the surfaces 132, 134 of the measurement object 130 is thereby imaged again by the optics 128 at the fiber end of the first fiber 124. Advantageously, the sensing head 114 comprises a beam splitter cube 129 such that the returning light reflected from the sensing object 130 is at least partially deflected and imaged onto the end of another fiber 136 arranged conjugate to the end of the first fiber 124. Thus, this light is only coupled into the fiber 136. The same applies to the measurement light that originates from the second fiber 126 and is reflected by the measurement object 130—it is coupled into a fiber 138 whose end is arranged conjugate to the end of the second fiber 126.

Since the fibers 124, 126 transport different wavelength ranges, the wavelength ranges which are coupled into the fibers 136, 138 are also different, without the need for additional filtering or switching. The optical fibers 136, 138 are connected to the spectrometer 116 such that two spatially spaced light inputs 140, 142 are provided for the fibers 136, 138. In a specific embodiment, the light inputs may be spaced apart, for example, 1-30 mm, and in one example may be 15 mm. In the spectrometer 116, the reflected light coupled into the spectrometer 116 via the two light inputs 140, 142 passes through the same spectrometer optics, indicated here by optics 144, 146 and, by way of example, a reflection grating 148.

Instead of a reflection grating 148, a grating operating in transmission or a prism can also be provided.

The reflection grating 148 splits the reflected light spectrally. The result of the spectral splitting is imaged onto a detector 150. The detector 150 enables location-dependent detection of an intensity distribution and can, for example, be in the form of a line, for example with the cells or pixels as described above.

In an embodiment, not shown for reasons of clarity, the reflection grating may be arranged such that the imaging of the light inputs onto the grating and the imaging from the grating onto the detector is done by the same optics, i.e. the optics 144 and 146 coincide.

The detector 150 detects the intensity of the measured light as a function of the location and thus as a function of the wavelength due to the splitting by the optical component such as the reflection grating 148.

As mentioned, the light from the two different optical waveguides 136, 138 passes through the same optics of the spectrometer 116. The light sources 120, 122 are switched on and off alternately, so that only light from a single wavelength range ever lands on the active surface of the detector 150. The detector 150 can be read out synchronously with the switching on/off of the light sources 120, 122, so that the spectrum detected in this way can be clearly assigned to a light source 120, 122.

The detector 150 or its detector line generates a corresponding signal from the optical spectrum, which is read out via the evaluation device 118. The evaluation device 118 is connected to the detector 150 via an electrical connection 152.

Figure 3:
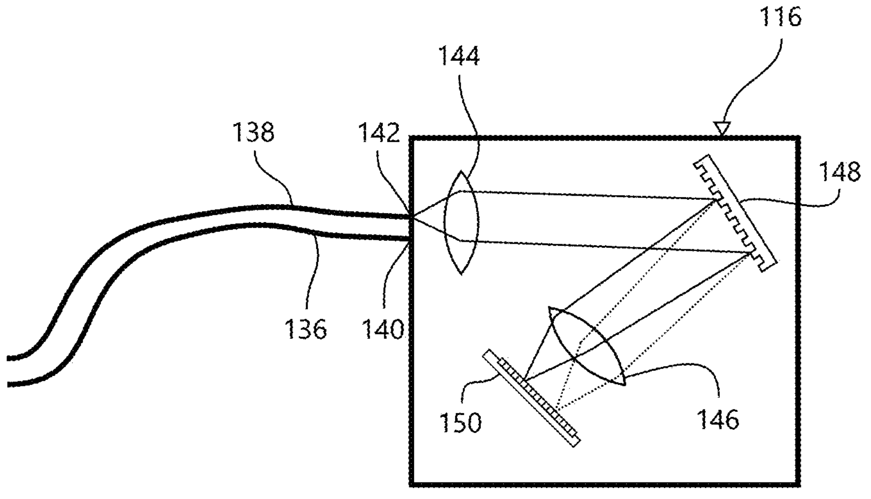
FIGS. 3, 4 various operating states of the optical thickness measuring device according to FIG. 2.
Figure 4:
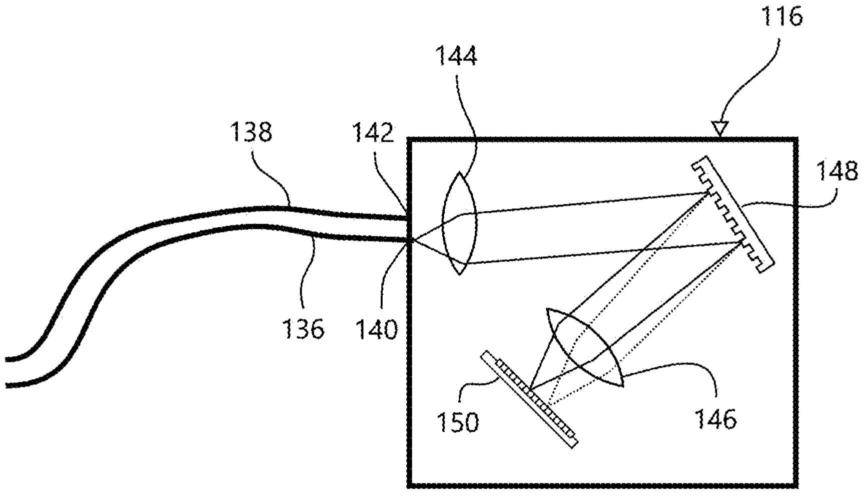

FIGS. 3 and 4 show a schematic representation of a section of FIG. 2 to illustrate various operating states. In FIG. 3, reflected light is directed via the waveguide 138 to the light input 142, which is assigned to a first wavelength range—here, for example, 430 nm-700 nm. Starting from the input location 142, the reflected light is collimated via the first optics 144 and directed onto the reflection grating 148. From there it is spectrally split, i.e. with a reflection angle dependent on the wavelength, onto the second optical system 146, where it is imaged onto a line of the detector 150. As indicated in FIG. 3, there are locally different intensities on the detector 150 depending on the wavelength of the reflected light. The beam path is shown (schematically) for two different wavelengths of the first wavelength range, with the longer wavelength shown as a dashed line. The light falling on the detector 150 covers a certain area of the active surface of the detector 150. A locally resolved spectrum of the reflected light thus appears on the detector line 150.

If, on the other hand, as illustrated in FIG. 4, light in a second wavelength range—here for example 830 nm-930 nm—is fed to the light input 140 via the fiber 136, this reflected light also couples into the optics 144 and is imaged from there collimated onto the reflection grating 148. Due to the different emission location of the light input 140, which is at a distance from that of the light input 142, a different angle of incidence on the reflection grating 148 results. This angle of incidence on the reflection grating 148 is selected such that it compensates for the different angle of emission for the light spectrally split by the grating 148 caused by the different wavelength range of the reflected light, and the detector 150 can in turn display an intensity distribution over the location of the detector line via the optics 146 as a function of the wavelength distribution of the reflected light.

In FIG. 4, light from the range 830 nm-930 nm is coupled into the spectrometer 116 via a second input 140. Due to the longer wavelength, the light is diffracted more strongly by the optical grating 148 than the light in the 430 nm-700 nm range. To compensate for this effect, the second input 140 is laterally offset relative to the first input 142, so that the reflected light strikes the optical grating 148 at a steeper angle. By selecting the appropriate lateral offset, it is possible to ensure that the areas on the active surface of the detector 150 on which the light from the respective spectrum lands at least partially overlap. This enables a particularly compact design.

Second Embodiment

Figure 5:
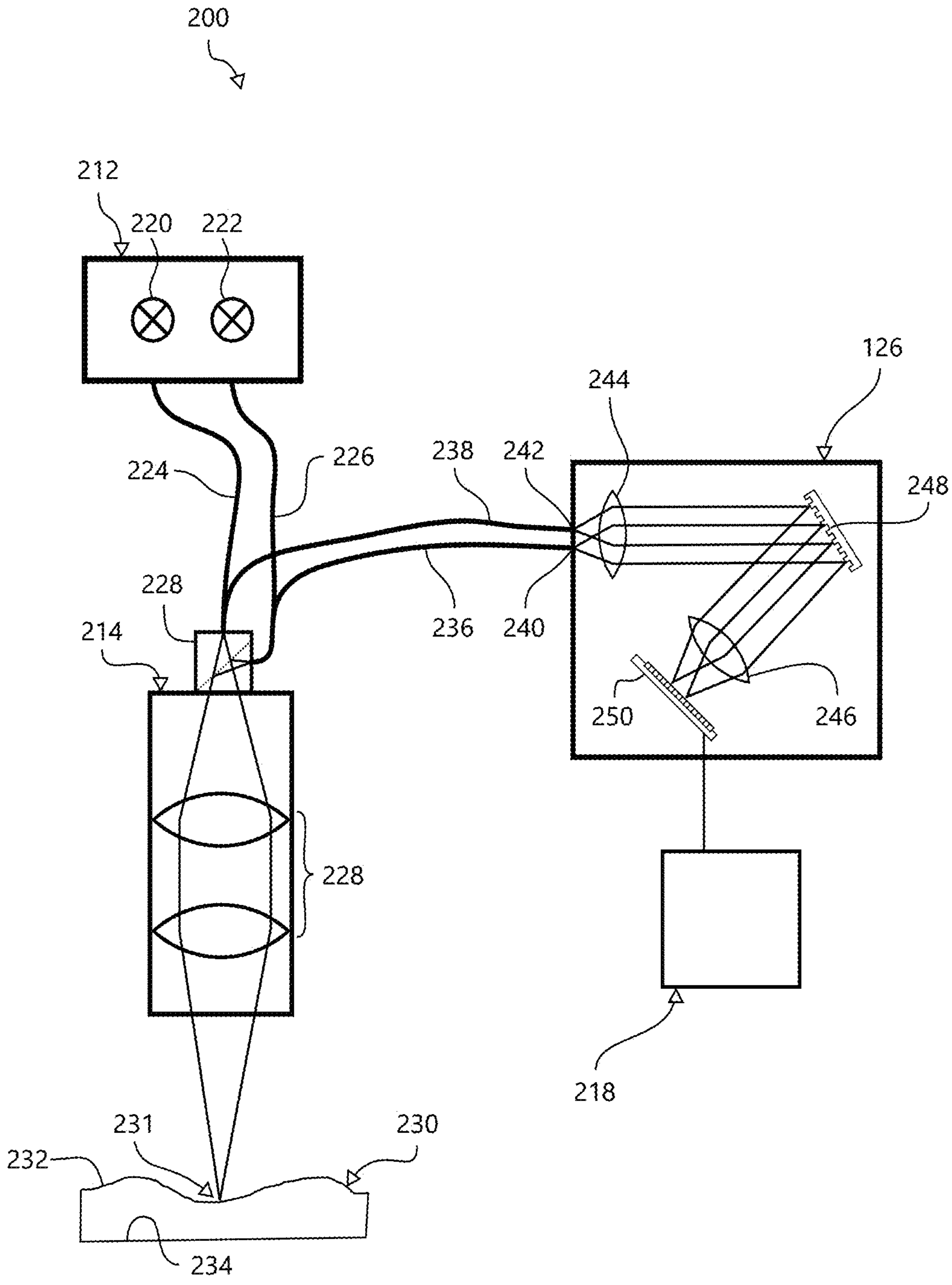
FIG. 5 a second embodiment of an optical thickness measuring device with a common measuring spot.

FIG. 5 illustrates an alternative embodiment of an inventive thickness measuring device 200. For all features described below, the same reference signs, only with 100 added, are used with reference to the reference signs of FIG. 2. Unless necessary, these are not described again.

The optical thickness measuring device 200 comprises a light source 212 having two light source units 220, 222. In contrast to the embodiment of FIG. 2, the different wavelength ranges of the light source 212 are fed to a common measuring spot 231 via the measuring head 214.

The light emerging from the light source units 220, 222 is fed to a dichroic beam splitter 229 via two fibers 224, 226. The light of a first wavelength range of a light source unit 220, which enters the beam splitter 229 from a first fiber 224, is transmitted, strikes the measurement object 230 (or one of the two interfaces 232, 234), is reflected from there and re-enters the fiber 224. A fiber 238 is connected to the fiber 224 via a fiber coupler. This reflected light is guided via this fiber coupler into the fiber 238, which guides the light to the light input 242. Similarly, the light of the other wavelength range of the light source unit 222 enters a second fiber 226, enters the beam splitter 229 laterally in the embodiment shown, is reflected there in the direction of the measuring head/measuring object and, after reflection at the measuring object 230, enters the fiber 226 again and is guided from there via a fiber coupler to the spectrometer 226 or the associated light input 240. The dichroic beam splitter 238 is selected such that light of the wavelength range that is supplied via the fiber 224 is transmitted as completely as possible, while light of the wavelength range that is supplied via the fiber 226 is reflected as completely as possible.

As an alternative to this embodiment, the beam splitter 229 may not be directly connected to the measuring head 214 but may be present as a separate element. In this case, the measuring light from the light source 212 can be guided into the measuring head 214 via a single fiber and only separated shortly before the spectrometer.

Third Embodiment

Figure 6:
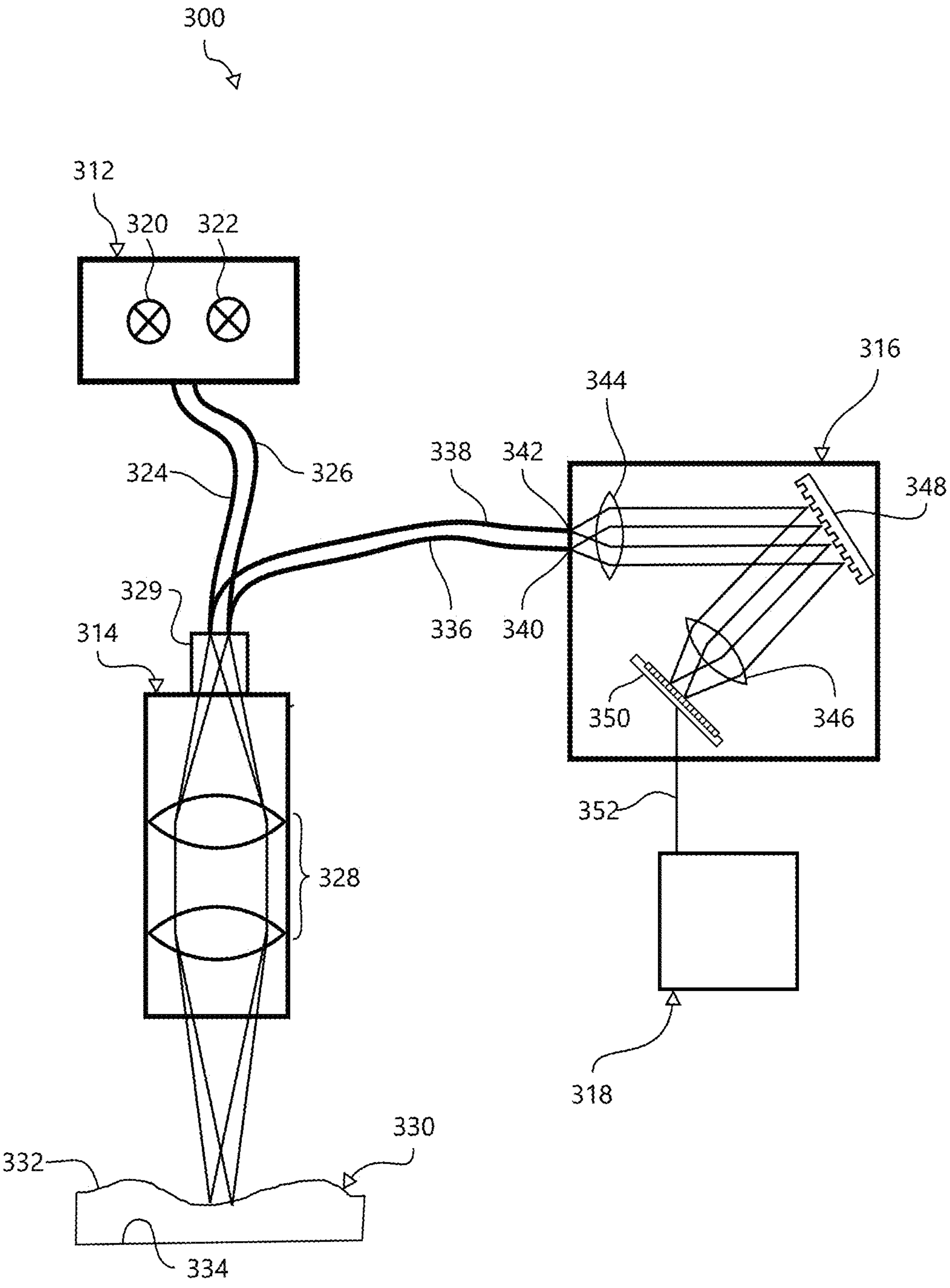
FIG. 6 a third embodiment of an optical thickness measuring device with an exclusively fiber-based light guide.

FIG. 6 illustrates a further embodiment of a thickness measuring device 300. In contrast to the previously described embodiments of FIGS. 2 and 5, the light guide in this embodiment is completely fiber-based outside the measuring head 314 and spectrometer 316. As in the embodiment of FIG. 2, the different wavelength ranges are coupled into the measuring head by separate fibers 324, 326 at different locations, and returning light is accordingly also imaged again at the end of the corresponding fiber and only coupled in there. Via fiber couplers, returning light in the fibers 324 and 326 is guided into the fibers 338 and 336 and from there to the spectrometer.

The third embodiment largely corresponds to the first embodiment, with the beam splitter being replaced by fiber couplers.

Conversely, it would also be possible to carry out the beam guidance completely in the free beam.

In all of the aforementioned embodiments, it may be provided that the spatially separated coupling into the spectrometer 116, 216, 316 takes place via ferrules, which may be arranged separately next to each other. Alternatively, the coupling can also take place via a double ferrule. The position of the partial spectra in the detector plane can be set based on the position of the ferrules or the distance between the fibers in the double ferrule.

On the one hand, the separation of the partial spectra on the detector can be set as already described so that there is a large spatial overlap on the detector for both wavelength ranges and the separation is achieved by timing the light source or the light source units.

Alternatively, a spatial separation of the partial spectra on the detector can also be achieved by selecting the spatial spacing of the inputs on the spectrometer in such a way that the partial spectra of the reflected light split by the grating are located on two different detector lines. In this way, timing can be omitted.

The spacing of the input points on the spectrometer can also be selected or combined in such a way that the detector rows are directly above each other, thus achieving a particularly compact arrangement.

In a further alternative, the spatial spacing of the inputs on the spectrometer can be such that the spectra do not overlap on the detector. In this case, only a partial area of the detector can be read out synchronously with the switching of the light sources in order to increase the readout rate. For example, the spectra can be positioned next to each other in the line on a detector with a line configuration. The distance between the spectra, which is actually determined by the diffraction/refraction/reflection conditions, can be reduced by the spatial arrangement and alignment of the light inputs, so that the available detector area can be used to optimum effect.

Fourth Embodiment

Figure 7:
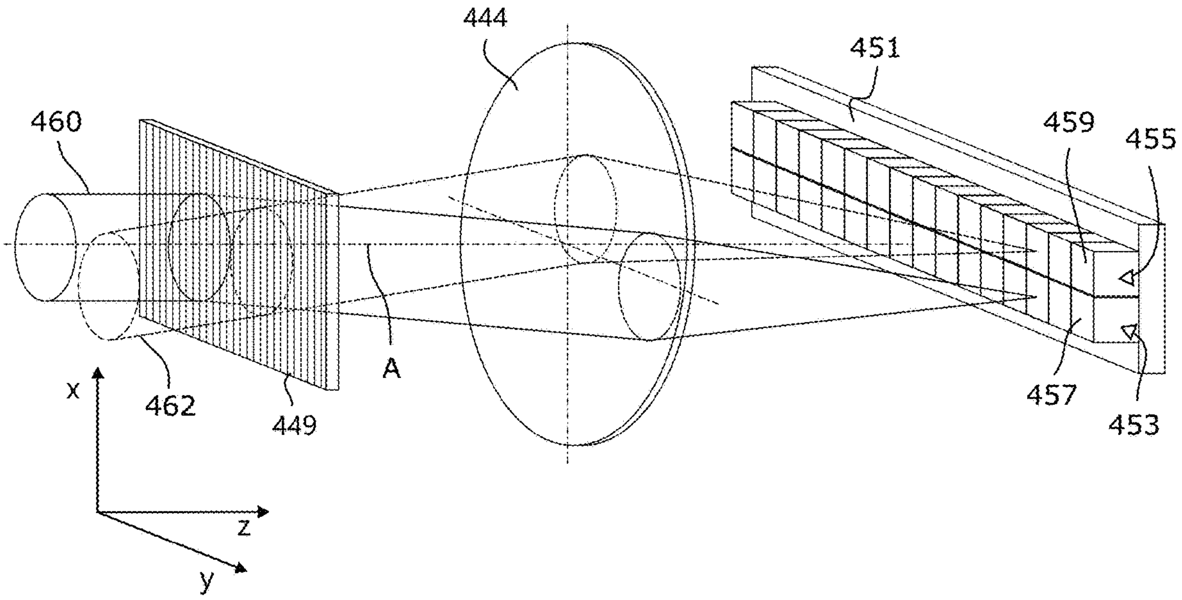
FIG. 7 a fourth embodiment of an optical thickness measuring device with a two-line detector.

This is illustrated in FIG. 7. FIG. 7 schematically shows a part of the spectrometer 116. A dispersive optical element is recognizable, which is designed here as a transmission grating 449, primarily for reasons of better visualization. The transmission grating 449 is arranged in the collimated beam path, as is also the case with the reflection gratings 148, 248, 348 shown in FIGS. 2, 5 and 6. As in the other embodiments, the converging lens 444 focuses the diffracted light onto the detector 451.

In contrast to the embodiments described above, the detector 451 has not just one, but two pixel lines 453, 455. Along the first pixel line 453, through which the axis A runs in the embodiment example shown, first pixels 457 are arranged, which are intended exclusively for light of a first wavelength range. Along the second pixel line 455, which is offset along the x-direction but runs parallel to the first pixel line 453, second pixels 459 are arranged, which are intended exclusively for light of a second wavelength range. The division into two pixel lines eliminates the need to switch the light sources.

The light of a first wavelength range—shown in FIG. 7 as a beam bundle 460 with solid lines—falls along the axis A onto the dispersive optical element (transmission grating 449). The axis A is tilted by a first angle α relative to the z-axis, for example. Since the diffractive structures of the transmission grating 449 extend along the x-direction, the light 460 is deflected in the plane spanned by the axis A and the y-axis depending on the wavelength and is directed by the converging lens 444 onto one of the first pixels 457 of the first pixel line 453.

The collimated beam bundle 462—indicated by a dashed line in FIG. 7—is light of a second wavelength range and, in this embodiment, strikes the transmission grating 449 along a second axis that is tilted relative to axis A. As a result, the converging lens 444 does not focus the light diffracted in the yz plane on a pixel 457 of the first pixel line 453, but on one of the second pixels 459 of the second pixel line 455 arranged offset to it in the x direction. As a result of the different directions of incidence, the light 460 of the first wavelength range and the light 462 of the second wavelength range can thus not be focused on the same pixel.

At the same time, the direction of incidence of at least one of the two beam bundles 460, 462 with respect to the z-axis is selected such that at least partial compensation of the wavelength-dependent diffraction takes place and thus light of a different wavelength range is deflected by the same dispersive element such that it also lands on the detector 451. Specifically, in this embodiment the direction of incidence of the light beam 462 is selected such that the direction of incidence on the dispersive element 449 includes an angle with the xz plane. This angle is selected in such a way that the stronger or weaker deflection in the yz plane caused by the other wavelength range is "corrected". The dispersed light thus also impinges on the detector 451, but, as described above, on the second detector line 455 or on one of the pixels 459.

Therefore, in this embodiment measurements with both wavelength ranges can be carried out simultaneously. This approach is therefore particularly well suited for the case where the actual distance to be measured between the two interfaces lies unfavorably between the wavelength ranges and ideally the measurement is to be carried out with both wavelength ranges simultaneously.

In order to be able to direct the light 460, 462 onto the dispersive optical element 449 from different directions, the light of the respective wavelength can be guided via separate fibers in fiber-based arrangements. The two ends of the fibers must then be arranged next to each other in the object plane of the spectrometer optics. In the embodiment shown in FIG. 7, an offset of the fiber ends along the x-direction for the control of the two detector lines 453, 455 and an offset in the y-direction for the adjustment of the dispersive effect of the grating 449 for the different wavelength ranges would have to be provided.

In general, in an arrangement with free beam propagation, the adjustment of the beam propagation can be achieved, for example, by aligning apertures or by using wedge prisms.

The desired spatial separation of light with two different wavelength ranges on the detector can also generally be ensured not only by different directions of incidence of the respective light on the dispersive optical element. Alternatively, it is also possible to polarize the light differently, e.g. orthogonally linearly polarized or oppositely circularly polarized. Then, with the help of suitable polarization filters, which are arranged for example directly in front of or on the pixels 457, 459, it can be achieved that the light with one wavelength only falls on pixels on which no light with the other wavelength can fall, and vice versa.

If two spectra are generated for a thickness value during a measurement, the thickness value can be calculated from the two partial spectra. If two measurement spectra with different bandwidths are used, the narrower-band spectrum for thicker wafers provides a higher accuracy and the wider-band spectrum for thin wafers.

The calculation of the thickness value can, for example, provide for a statistical weighting of the two partial spectra. The narrowband spectrum provides a higher accuracy for thick wafers, the broadband spectrum for thin wafers. The thickness value that can be calculated is always based on the partial spectrum that is best suited for the current thickness.

In one example, this calculation is not based on a fixed threshold value, but on a weighted average value, for example. A transition range can be defined, within which the weighting depends on the approximate position of the transition range at which the current thickness to be measured is located or/and the weighting can be dependent on the last calculated value or/and on the two measured values.

Alternatively, or additionally, the weighting of the two measured values for the same thickness can also be carried out on the basis of the quality of the individual measured values determined. A measurement peak height (corresponding to the amplitude of the interference modulation) or any measure of the statistical noise of the value (e.g. variation over a period of time) can be used as a measure of quality.

Fifth Embodiment

Figure 8:
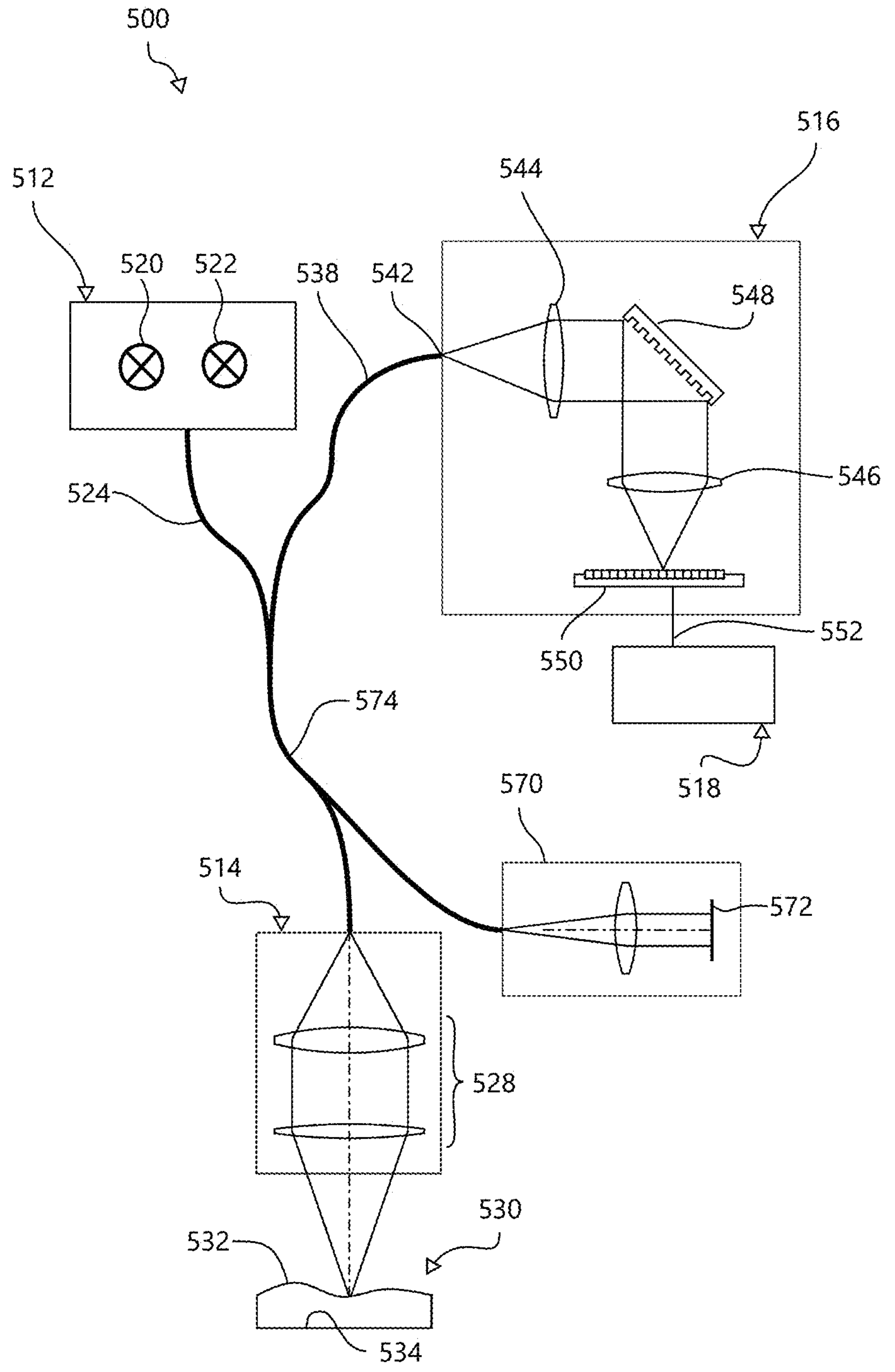
FIG. 8 a fifth embodiment of an optical thickness measuring device with a reference arm.

In order not only to be able to determine the distance between two interfaces—as in the previous embodiments—but also to obtain absolute distance measurement values, a reference light can be provided. FIG. 8 shows an embodiment example of such a measuring device 500, which largely corresponds to the embodiment example shown in FIG. 6, with the difference that a reference arm 570 with an end-side mirror 572 is additionally connected to a fiber coupler 574. In addition, for reasons of clarity, only a single light path for one light wavelength is shown. In the reference arm 570, measurement light generated by the light source 512 is reflected at the mirror 572 and interferes in a fiber coupler 574 with measurement light reflected at one of the surfaces 532, 534 of the measurement object 530. The interference is detected by the spectrometer 516 and generates a modulated spectrum on the detector 550. By means of a fast Fourier transformation (FFT), modulation frequencies can be obtained from the spectrum, each of which is assigned to a distance value. For further details, reference is made to DE 10 2016 005 021 A1 of the applicant.

In order to be able to perform the FFT, the phase-dependent intensity Pint(ki) must first be derived from the intensity values Pint(pi) measured by the individual pixels pi. The wavenumber k is related with the wavelength λ by the relationship $$k = n(\lambda)/\lambda$$

wherein n(λ) denotes the dispersion of the medium of which the measurement object 530 consists and into which the measurement light may penetrate. The wavelength λ is in turn assigned to the pixel numbers p via an assignment table pi=pi(λi). The result is an assignment between wavenumbers k and pixel numbers p, which is required for converting the pixel-dependent intensity Pint(pi) to the phase-dependent intensity Pint(ki). For further details, reference is made to DE 10 2017 122 689 A1 of the applicant. Depending on the application, several reference arms and/or a length-adjustable reference arm can be used.

Sixth Embodiment

Figure 9:
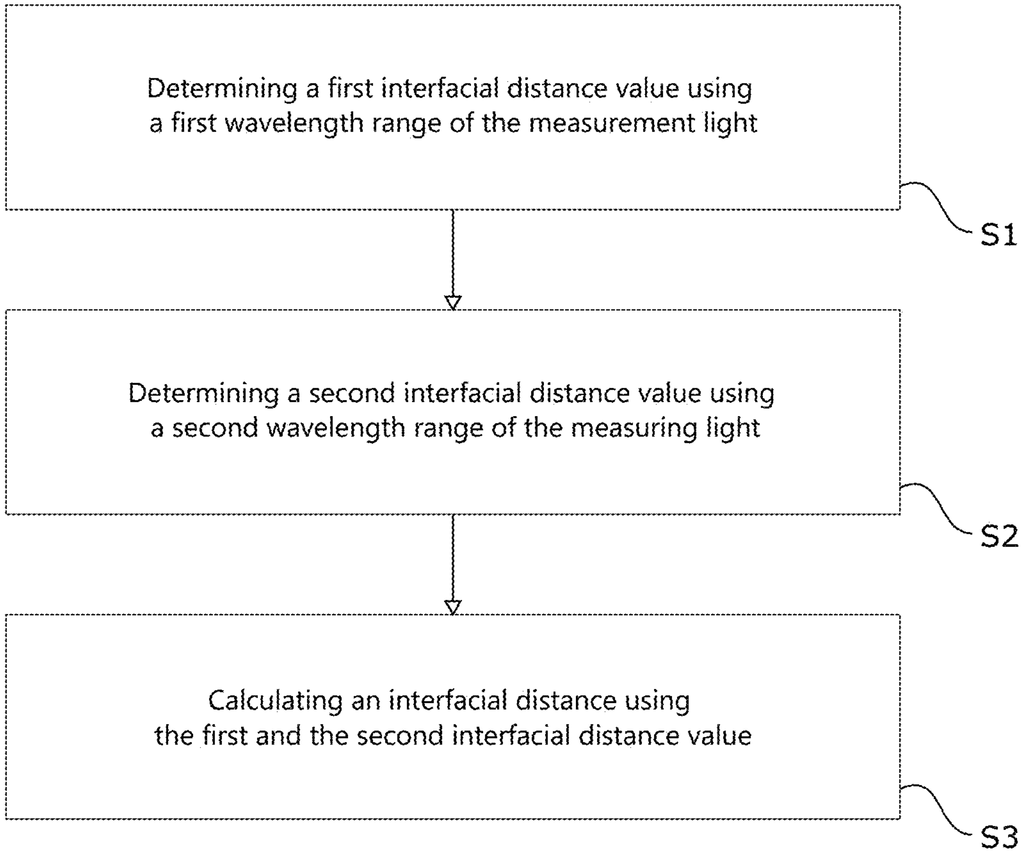
FIG. 9 an embodiment of a method according to the present disclosure.

FIG. 9 illustrates one embodiment of the method according to the present disclosure. In a first (S1) and a second (S2) step, a first interface distance value (value of the distance between a first and a second interface) is determined by means of a first wavelength range of the measuring light and a second interface distance value is determined by means of a second wavelength range of the measuring light. For example, a measuring light can be generated in a first and a second wavelength range for this purpose. As described above, the first wavelength range can be in the visible range, for example between 430 nm and 700 nm. The second wavelength range can, for example, be a sub-range in the 700 nm to 1600 nm range, in particular approx. 830 nm to approx. 930 nm, approx. 870 nm to approx. 970 nm or approx. 950 nm to approx. 1100 nm. In one example, the bandwidth of the first light source differs from the bandwidth of the second light source. In particular, the first wavelength range is broadband and the second wavelength range is comparatively narrower. The narrower wavelength range provides higher accuracy for thick wafers, while the broadband wavelength range provides higher accuracy for thin wafers. In an embodiment, the first light source unit is a light emitting diode (LED) and the second light source unit is a superluminescent diode (SLD). The narrow-band wavelength range may be particularly advantageous for the longwave wavelength range and the broad-band wavelength range for the short-wave wavelength range.

When determining the interfacial distance values, the measuring light can be quickly switched between the two wavelength ranges, for example with a frequency in the kHz range, i.e. between 0.5 kHz and 100 kHz. In this way, it is possible to achieve an almost continuous transition between the individual wavelength and therefore also measurement ranges. At the same time, in a measuring range that is covered by two wavelength ranges, but in which the respective individual measuring light only offers a poorer quality/intensity, an overall significantly better measuring signal can be achieved by averaging the two measuring light results.

For this purpose, a weighted averaging, for example weighted on the basis of the quality of the measurement signal, can be performed (S3).

What is claimed is:

1. An optical thickness measuring device comprises:

a light source;

a measuring head;

an optical spectrometer with an optical component for spectral splitting of an input light and a detector; and an evaluation device, wherein a) the light source is optically connected to the measuring head and is configured to generate a measuring light and to direct the measuring light to the measuring head, b) the measuring head is optically connected to the spectrometer and is configured to guide the measuring light onto a measuring object and collect reflected light therefrom that originates from two different boundary surfaces, and guide the reflected light to the spectrometer as input light, c) the spectrometer is electrically connected to the evaluation device and is configured to generate a spectrum of the reflected light that originates from the two different boundary surfaces of the measurement object and interferes with one another and is configured to transmit the spectrum as an electrical signal to the evaluation device, d) the evaluation device is configured to determine a distance between the two boundary surfaces, e) the measuring light has at least a first wavelength range and a second wavelength range, f) the spectrometer has first and second light inputs for the reflected light, wherein the reflected light of the first wavelength range emerges from the first light input and the reflected light of the second wavelength range emerges from the second light input, and g) the first and second light inputs are spatially spaced such that both of the first and second wavelength ranges are spectrally split by a common component and imaging areas on a detector at least partially overlap in a direction of the spectral splitting.

2. The device according to claim 1, wherein the light source comprises a first light source unit and a second light source unit.

3. The device according to claim 2, wherein a bandwidth of the first light source unit differs from a bandwidth of the second light source unit.

4. The device according to claim 2, wherein the first light source unit is switchable independently of the second light source unit.

5. The device according to claim 1, wherein the light source is configured such that the measuring light in the first wavelength range can be generated alternately with the measuring light in the second wavelength range.

6. The device according to claim 5, wherein the light source is configured such that the measuring light in the first and second wavelength ranges can be generated alternately with a fixed clock.

7. The device according to claim 6, wherein the spectrum is read out by the evaluation device synchronously with the fixed clock of the light source circuit.

8. The device according to claim 1, wherein the detector comprises two lines, which can be read out separately.

9. The device according to claim 8, wherein the two lines are shifted in the spatial direction transverse to the spectral splitting.

10. The device according to claim 9, wherein the two lines are shifted directly above each other.

11. The device according to claim 1, further comprising a reference arm.

12. The device according to claim 1, wherein connections between the light source and the measuring head and/or between the measuring head and the spectrometer each comprise two optical fibers.

13. The device according to claim 1, wherein the evaluation device is configured to generate a first spectrum and a second spectrum of the first reflected light and the second reflected light, respectively, with the respective measuring light of the first wavelength range and the second wavelength range, to determine the respective thickness from the respective first and second spectra and to calculate two values for the thickness with each other.

14. An optical thickness measuring device comprising:

a light source;

a measuring head;

an optical spectrometer with an optical component for spectral splitting of an input light and a detector; and an evaluation device, wherein a) the light source is optically connected to the measuring head and is configured to generate a measuring light and to direct the measuring light to the measuring head, b) the measuring head is optically connected to the spectrometer and is configured to direct the measuring light onto a measuring object and to capture reflected light therefrom that originates from two different boundary surfaces and is configured to direct the reflected light to the spectrometer as input light, c) the spectrometer is electrically connected to the evaluation device and is configured to generate a spectrum of the reflected light that originates from the two different boundary surfaces of the measurement object and interferes with one another and is configured to send the spectrum as an electrical signal to the evaluation device, d) the evaluation device is configured to determine a distance between the two boundary surfaces, e) the measuring light has at least a first wavelength range and a second wavelength range, f) the light source is configured such that the measuring light in the first wavelength range can be generated alternately with the measuring light in the second wavelength range in a fixed cycle, and g) the spectrum is read out by the evaluation device synchronously with the fixed cycle of the light source.

15. The device according to claim 14, wherein, in each case, only regions of the detector are read out on which a wavelength range is imaged, which is generated simultaneously for reading out.

16. A method for determining a distance between two boundary surfaces of a measurement object, the method comprising the steps of:

a) generating at least low-coherence measurement light with a first wavelength range;

b) guiding the measurement light onto the measurement object;

c) collecting reflected light and generating a spectrum of the reflected light that has been reflected at different boundary surfaces and interferes with each other;

d) repeating steps a)-c) with measurement light of a second wavelength range;

e) determining a first interfacial distance value using the first wavelength range of the measurement light;

f) determining a second interfacial distance value using the second wavelength range of the measuring light; and g) calculating an interfacial distance using an averaging of the first interfacial distance value and the second interface distance value.

17. The method according to claim 16, wherein the interference of the reflected light is either between a reflected light of an interface of the measurement object and a reference light and/or between a reflected light of a first interface of the measurement object and a reflected light of a second interface of the measurement object.

18. The method according to claim 16, wherein the averaging of the first interface distance and the second interface distance is a weighted averaging.

* * * * *